United States Patent

[11] 3,591,158

[72] Inventors Heinz-Deiter Pantke
Essen-Frintrop;
Ulrich Pohl, Oberhausen-Osterfeld;
Hermann Trecker, Kirchhellen, all of,
Germany
[21] Appl. No. 834,065
[22] Filed June 17, 1969
[45] Patented July 6, 1971
[73] Assignee Huttenwerk Oberhausen AG
Oberhausen, Germany
[32] Priority July 10, 1968
[33] Germany
[31] P 17 58 638.8

[54] SHAFT FURNACE
7 Claims, 5 Drawing Figs.
[52] U.S. Cl. .................................................. 266/25,
263/29, 266/27
[51] Int. Cl. ................................................ C21b 7/00
[50] Field of Search ............................................ 263/29;
266/27, 25

[56] References Cited
UNITED STATES PATENTS

| | | | |
|---|---|---|---|
| 2,628,829 | 2/1953 | Ruiz | 263/29 |
| 3,401,922 | 9/1968 | Jones, Jr. | 263/29 |
| 3,450,396 | 6/1969 | Pantke et al. | 266/25 |
| 3,482,714 | 12/1969 | Orguri et al. | 266/27 X |

Primary Examiner—John J. Camby
Attorney—Karl F. Ross

ABSTRACT: A shaft furnace for the gas reduction of metallurgical ores which provides a gas-distributing body centrally of the furnace chamber at the bottom of the furnace column, a support plate below a downwardly converging funnel, the outlet of which has a width corresponding to the gas-distributing element, members for shifting the charge along the support table out of the furnace, and a furnace-charging arrangement having a pair of sliding-plate gas gates or locks between which an intermediate charge-receiving arrangement is provided to restrict the free-fall height of the charge. The gas-distributing element is a roof- or coping-shaped body which is open downwardly and is supplied with reducing gas from one or both ends.

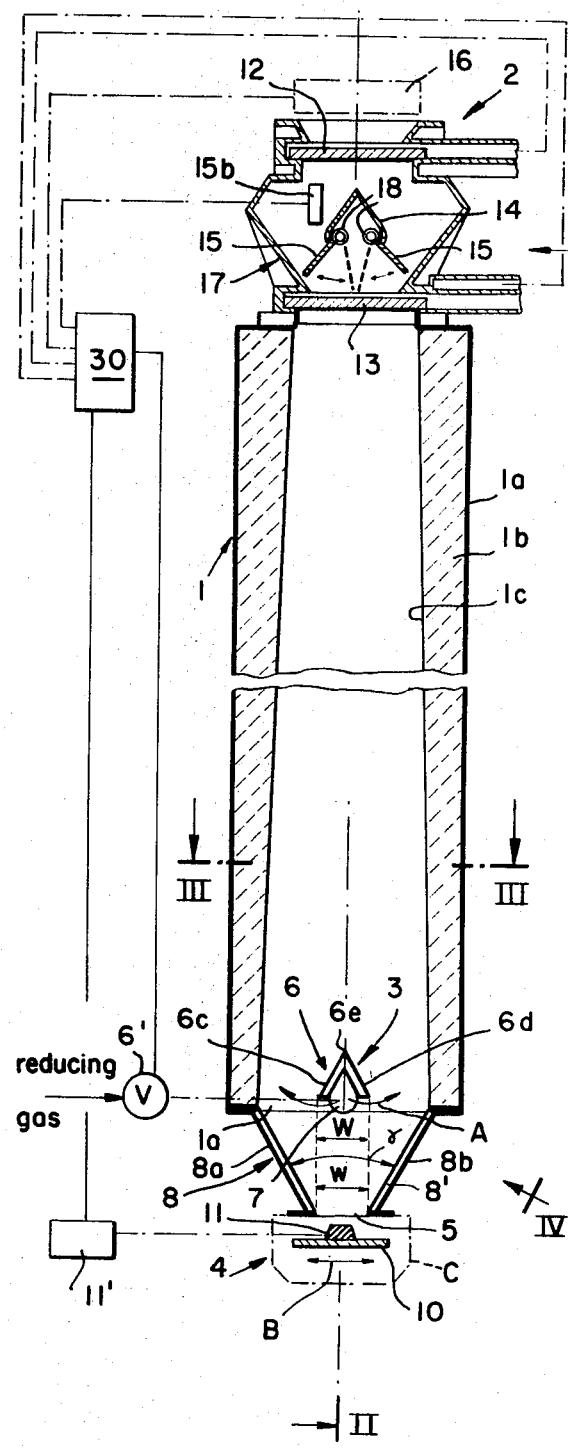
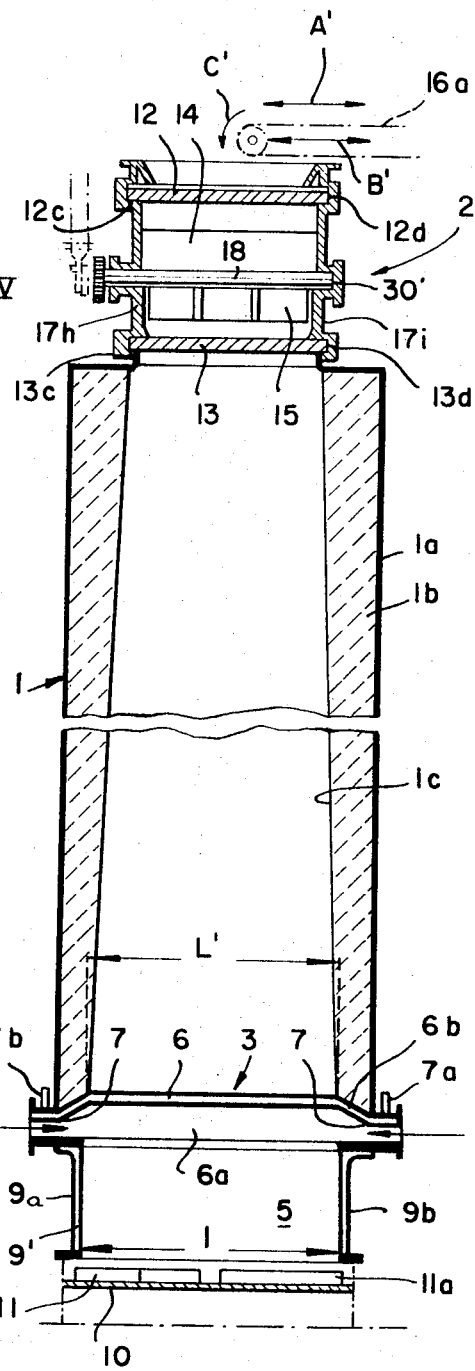

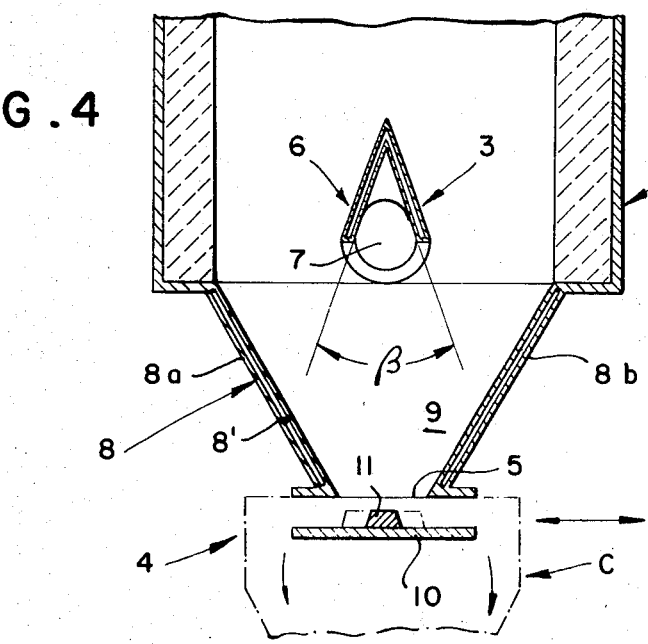
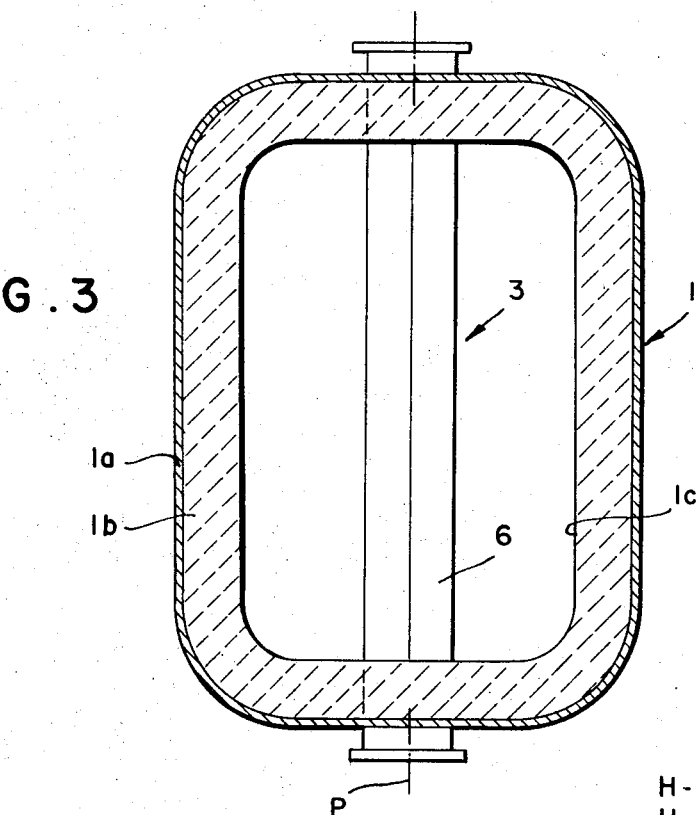

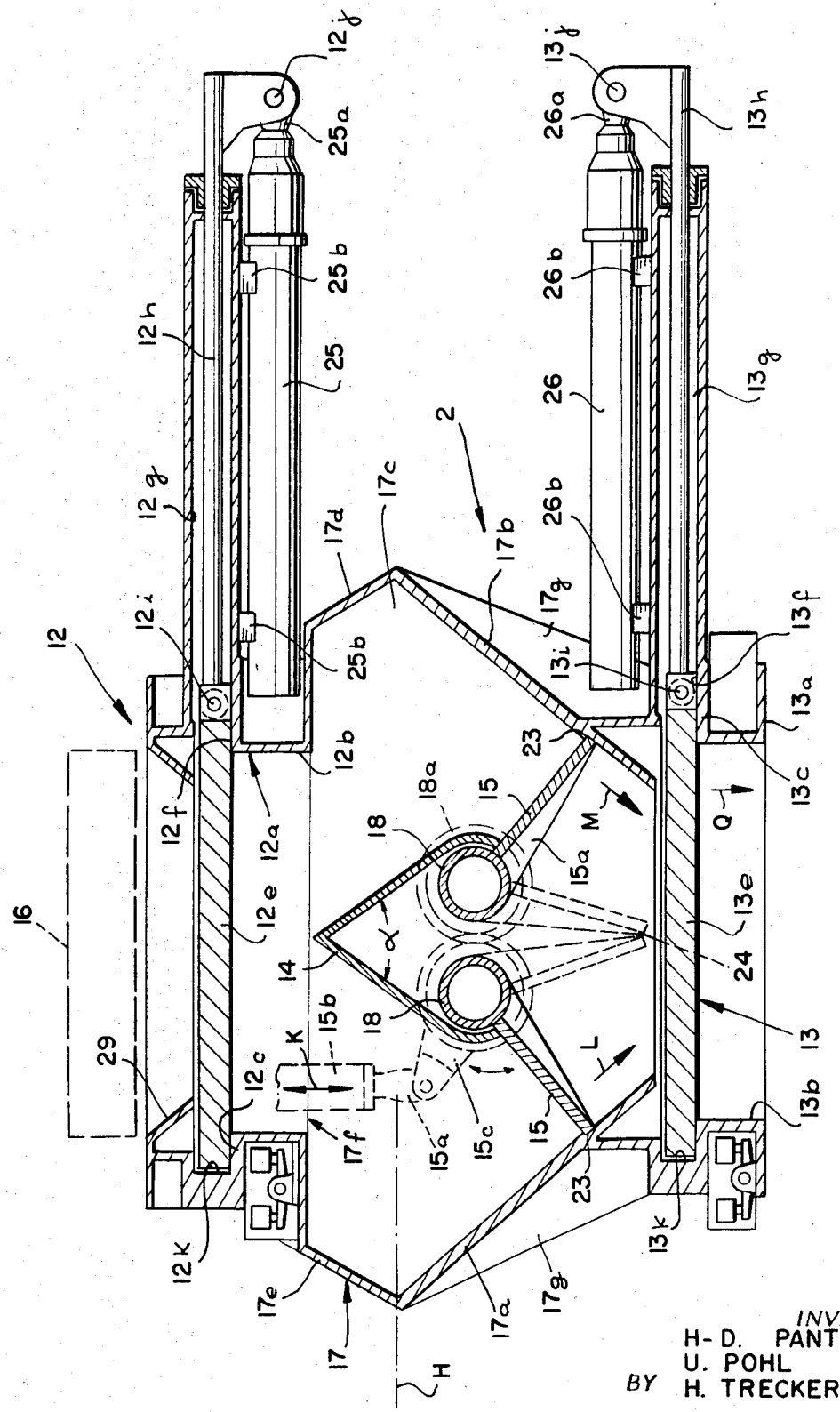

SHAFT FURNACE

The present invention relates to shaft-type furnaces and, more particularly, to furnaces for the direct reduction of metallurgical ores and especially iron ore.

In recent years, it has become common practice to use direct-reduction methods in the transformation of metal oxides, e.g. in the form of metallurgical ores, into the elemental metal which is recoverable as a solid sponge or is smelted in the bosh or hearth of the furnace to produce molten metal.

The present invention is directed to a system of this general type in which the metal is recovered in a solid condition, preferably as a sponge. Shaft-type furnaces for the direct reduction of iron ore by passing the iron ore directly into the column of the furnace in a gradual counterflow to a rising stream of a reducing gas, consisting predominantly of carbon monoxide and hydrogen, produce a sponge-iron product which may be formed with high efficiency and high purity, depending upon the starting materials, the gas composition, the nature of the furnace and its operating modalities, etc.

Such shaft furnaces are provided in various forms and can be generally described as an upright column or shaft at the lower end of which a reducing gas is introduced, generally through tuyeres, gas pipes or the like around the periphery of the furnace and the charge bed therein. At the upper end of the furnace, which may be operated at a pressure above ambient, a sealing or closure arrangement is provided in conjunction with a charging housing through which increments of charge are added to the bed. As a consequence, when high pressure is used, the apparatus for charging the furnace must preclude the escape of gases at elevated pressure and yet permit additions to the charge as indicated above.

It has been recognized heretofore that one of the critical problems in such furnaces is the nonuniformity of the reaction occurring within the shaft. For example, one of the disadvantages of conventional systems in charging a shaft-type furnace is that relatively long freefall paths are provided for the charge, thereby inducing or permitting deterioration thereof. Such conventional systems also are characterized by a tendency toward separation of the charge into fine and coarse fractions, with respect to the particle size, and thus by a tendency toward segregation or stratification of the charge into localized concentration of coarse and fine particles.

Conical closure members or bells of the type hitherto used as gas-blocking gates, tend to deposit the charge in a generally conical pile leading to a concentration of the fine fraction of particles along the upper part of the cone, while the coarse-particle fraction concentrates elsewhere, the pile being in the form of a ridge somewhere between the center of the furnace and the furnace wall. As the charge is increased and becomes compacted, a uniform penetration of the charge by the gas cannot occur.

In fact, in the design considerations of such furnaces, efficient operation requires a high throughflow of the gaseous phase and thus relatively high charge porosity and yet sufficient charge density that the elemental metal will be produced at high rates and with economy. Since there is a tendency in conventional systems, as noted earlier, toward segregation and concentration of fine and coarse particles in the bed of the furnace, the gases may traverse channels in the less dense regions to the exclusion of the remainder of the body. Portions of the charge then remain unreacted while other portions are brought into intimate contact with excessive quantities of the reducing gas with no increased output from these portions.

Consequently, it has been recognized earlier that better results will be obtained with less stratification if the particles of the charge are uniform and more or less agglomerated to prevent a fine-particle fraction from blocking the interstitial channels in the charge column. To this end, it has been proposed to form the charge prior to its introduction into the furnace as "pellets" or "briquets" by pelletizing and briqueting operations which have become commonplace in the metallurgical field, both for the reasons indicated above and because the larger agglomerates are an easily handled product of the upgrading of metallurgical ores. Since most handling procedures for such pellets are quite rough, the pellets have hitherto been subjected to a hardening treatment, e.g. sintering, baking or cementation, although these steps increases the cost of the pellets. More recently, it has been found to be desirable to use so-called "green pellets," i.e. pellets which are formed by agglomerating finely divided powders of the metallurgical or in the presence of moisture, such pellets having low compressive strength and relatively high tendency toward deterioration upon free-fall and abrasive contact with support surfaces and neighboring pellets. Conventional shaft-type furnaces have not been able to make use of such green pellets in a convenient manner because of the tendency toward pellet breakdown which leads to formation of a fine-particle fraction filling the interstices of the mass.

While various suggestions have been made as to how the efficiency of shaft-type furnace can be improved and indeed suggestions have been made as to the distribution of the gas in the furnace, the technique for introducing the charge into the furnace, etc., it has been found that there is an intimate relationship between all of these factors and the method by which the reduced charge is removed from the furnace which must be considered if any significant improvement in furnace efficiency and the ability of the furnace to handle green pellets adequately is to be desired. In other words, while separation and segregation of the charge may be prevented by some charging systems, this alone does not insure a uniform distribution of the gases within the charge bed already within the furnace. Similarly, the provision of a system for distributing the gases more or less uniformly over the entire cross section of the furnace at the location of the gas-introduction zone, also does not suffice alone to insure that gas distribution will be uniform at sites above this zone.

It is, therefore, the principal object of the present invention to provide an improved system for the treatment of metallurgical ores and the like with reducing gases, such that channeling and other concentrations of gas flow in some areas to the exclusion of others, does not occur and the overall product is formed homogeneously, of high purity and economy.

Another object of this invention is to provide an improved shaft-type furnace capable of obviating the aforementioned disadvantages and operating more efficiently than earlier furnaces of the same general character.

These objects and others, which will become apparent hereinafter, are attained in accordance with the present invention, by a shaft furnace system characterized by a combination of features which are found, most surprisingly, to have an intimate interrelationship such that the use of any one of these features or the use of these features in pairs, in any combination, fails to give results even approximating those obtained with the three basic features in combination; in fact this combination of features appears to be more or less synergistic in giving rise to new, improved and unexpected results far greater than any which could be predicted from the use of each of the features individually or in pairs.

According to a first essential feature of this invention, which must be considered together with the second and third features set out below, the upright shaft-type furnace whose cross section is rectangular (e.g. a square or a polygon having two longitudinal and two transverse sides) is provided at its bottom with an upwardly converging, centrally disposed, roof-shaped or coping-shaped gas-distributing element in the form of a hood, the underside of which is open to permit the gas to emerge around the outside of the hood, the reducing gas being introduced into the hood axially at one or both ends thereof by a gas-supply line. A distributor of this type is described in application Ser. No. 568,049, filed 26 July (now U.S. Pat. No. 3,450,396) and is commonly owned with the present case.

The second essential feature of the invention, which must be present in conjunction with the first feature discussed above and the third feature set out below, is the provision of an outlet arrangement for the furnace in the form of a downwardly converging funnel-shaped structure below the gas distributor and defining a narrow outlet, the width of which corresponds to the horizontal width of the gas distributor and which is axially aligned therewith such that the opening conforms substantially to the downwardly projected outline of the gas distributor. The outlet is provided with a support plate upon which the charge is carried and a reciprocating member which is displaceable transversely of the gas distributor to discharge sponge iron from the furnace.

The funnel-shaped member is defined between a pair of downwardly converging flat walls lying parallel to the major dimension of this elongated distributor and a pair of lateral vertical walls extending perpendicularly thereto, this relationship of the wall structures having been found to be critical.

The third essential feature of this invention is the provision at the head of the furnace of a charging housing in which an intermediate charge-catching member is provided between upper and lower gas-sealing gates to reduce the free-fall height of the charge. Preferably, this charging structure has a roof-shaped, upwardly converging charge-distributing member extending parallel to and coplanar with the gas-distributing member therebelow. The furnace, moreover, preferably diverges downwardly from the charging housing to the gas-distributing element.

In application Ser. No. 711,102 filed 6 Mar. 1968, now U.S. Pat. No. 3,511,390, there is described an apparatus for charging an upstanding shaft-type furnace which comprises a conveyor means for advancing the comminuted material or charge to the apparatus and a pair of upper and lower closure members adapted to bar the escape of gas and gas entrained particles from the furnace. That system was based on the discovery that, when the dispensing device, which receives the comminuted material from the conveyor and is located between the closure members, is a tiltable tray whose swinging axis extends parallel to the direction of movement of the conveyor so that the latter is displaceable in the direction of this horizontal axis, a uniform layer of comminuted material is deposited in the furnace without formation of a piling cone and with a substantially uniform thickness. The conveyor means is a band-type conveyor which may be discontinuously operable in the cadence of the swinging movement of the tiltable distributing tray, while the closure members are horizontally shiftable gates lying in planes perpendicular to the axis of the furnace above and below the tiltable tray. These linearly slidable horizontal gates, which are displaceable between a chamber receiving each gate in the open condition thereof, and a position in which the gates spans the mouth of the furnace is capable of overcoming some of the substantial disadvantages of earlier systems whereby particle-entraining gases at high velocity form ridges, grooves and the like by mechanical erosion of the sealing edges of the closure members. In fact, with the linear horizontal displacement of the platelike gates, which are slidably guided along their opposite longitudinal edges in recesses of a support frame surmounting the furnace and with the forward edge of the gate being lodged in a similar recess at the far side of the frame, there appears to be no deterioration of the sealing parts. The gates may, as described earlier, be operated alternately in the cadence of displacement of the distributing tray. Advantageously, a hydraulic or pneumatic system is provided in which the slidable gates are shifted by piston-and-cylinder arrangements, while a further cylinder serves to displace the tiltable tray via a lever. It has been found that this type of control system is particularly satisfactory for use when a number of tiltable trays are used in tandem with reversible conveyors or duct systems for delivering the charge to the apparatus.

According to a specific features of this invention, the gas-distributing member is of the type described in application Ser. No. 568,049 in which there is shown and claimed a shaft-type furnace for the direct reduction of iron oxide to elemental iron in which the sponge-iron removal system comprises a downwardly convergent discharge funnel whose upper end corresponds in cross-sectional area to that of the lower end of the furnace and which thus converges from a mouth of dimensions equal to those of the furnace chamber to a constricted discharge opening of geometrically similar configuration provided with a mechanism for mechanically discharging the sponge iron.

The funnel serving to discharge the sponge iron can be cooled with the aid of a cooling fluid and, for this purpose, it has been found to be advantageous to provide the walls of the funnel as so-called double walls, i.e. with a clearance between inner and outer wall surfaces through which a cooling fluid can be circulated. The walls need not be cooled if they are composed of a refractory material such as a ceramic, although it has been found to be desirable to cool the wall even in this case. The gas-distributing member is upwardly convergent, e.g. of ridge shape, and communicates with at least one but preferably two gas-supply pipes opening into the distributing member below the peak thereof. The acute apex angle of the upwardly convergent member is such that no material tends to remain thereon during descent of the product through the base of the column. The outward deflection by the gas-distributing member of the charge and the inward deflection by the funnel appear to completely eliminate the passive zone normally formed in silo-type structures. Under these circumstances, the rate of throughput of the solid material is sharply increased by comparison with other shapes of furnaces of similar cross-sectional area and height. Moreover, the central gas-distributing member insures that the rising stream of gases will be uniformly distributed over the entire charge. A particularly convenient arrangement uses a pair of gas ducts which communicates with the interior of the gas-distributing member which diverts the gas laterally into the column; the gas-distributing member thus constitutes a member bridging these ducts. The ridge-shaped member can form an inverted and downwardly open trough with which the ducts communicate and which passes diametrically through the column directly above the funnel. Fluid cooling means is also provided for gas-distributing member and the ducts supplying same.

According to a more specific feature of the invention the charging apparatus makes use of upper and lower gates and provides between the upper and lower sliding-plate gates of the charging apparatus, a central hoodlike distributing arrangement for the charge. The hoodlike member, which is upwardly converging and lies along a vertical median plane of the furnace, is disposed below the upper closure member and above the lower closure member while being provided with a swinging-flap arrangement adapted to subdivide the interior of the housing of the charging apparatus into upper and lower compartments sealed from one another when the flaps are shifted into their "closed" position. The flaps according to the present invention, cooperate with downwardly converging walls of the housing, which thereby constitutes a hopper structure, terminating in a mouth of reduced cross section closed by the lower sliding plate. Above the distributing and deflecting hood, which overlies and protects the shaft of the swinging flaps, the housing may also diverge toward a mouth closed by the upper sliding plate. The location of the charge distributor and flap-seal arrangement intermediate the two gas-lock gates has been found to significantly reduce the free-fall height of the charge and in fact to substitute for a free fall of the charge through the gas lock, a sliding and rolling feed of the charge into the furnace with a corresponding reduction in deterioration of "green" pellets and segregation of the particles of the charge into coarse and fine fractions. In fact, this action mixes the charge thoroughly so that instead of segregating, there is a tendency toward a more homogenous distribution of particle sizes in the layer of charge deposited in the furnace.

The gas-distributing hood in the housing between the gates is of roof or coping shape, i.e. as a pair of downwardly diverging surfaces extending in the major dimension of the housing which may be rectangular in horizontal cross section, and meeting at an acute-angle junction at the peak of this distributor. The flaps, which extend along the sides of the roof-shaped distributor, are journaled, in accordance with a particular feature of this invention, on respective shafts lying in a common horizontal plane and symmetrically on opposite sides of a vertical median plane of the furnace and charging apparatus.

Preferably, the housing is elongated, as noted above and both the horizontal shafts which lie wholly within the outlines of the roof-shaped distributor and a downward projection of the outline thereof so as to be protected from the charge introduced into the housing from above, span the housing in the longitudinal direction and are coupled for joint rotation by, for example, meshing gears externally of the housing. When the flaps are swung symmetrically inwardly, i.e. toward one another, they abut in the aforementioned median plane of symmetry to unblock communication between the upper part of the housing and the lower housing portion, while simultaneously releasing the charge previously deposited on these flaps into the furnace. In their outer or spread positions, the flaps abut stops formed on the housing walls to constitute a support for the charge increment which is introduced into the housing.

The housing is formed with downwardly converging frustoconical longitudinal walls and at least a pair of vertical end walls, the converging walls defining chutes with the respective flaps, along which the green pellets roll and slide as they pass into the interior of the furnace. In their spread positions, the flaps or wings preferably lie at about right angles to the converging walls of the housing above the distributor, the housing converges toward the inlet opening or mouth which is blocked by the upper gate. It has been found that the symmetrical arrangement described above prevents separation of the charge into large and small particle fractions and in addition limits free fall of the particles.

The charge is fed to the housing by a conveyor means, e.g. an endless band conveyor which is shiftable in the direction of elongation of the roof-shaped distributor. Preferably, the conveyor alternates between housings each of which has a roof-shaped distributor and cooperating flaps or wings of the type described.

The above and other objects, features and advantages of the present invention will become more readily apparent from the following description, reference being made to the accompanying drawing in which:

FIG. 1 is a vertical cross-sectional view through a shaft furnace embodying the present invention;

FIG. 2 is a cross section taken along the line II—II of FIG. 1 and corresponding to a section in the vertical median plane of the furnace along the major dimension thereof;

FIG. 3 is a cross-sectional view taken along the line III—III of FIG. 1;

FIG. 4 is a detail view of the region IV of FIG. 1; and

FIG. 5 is a detail view of the region V of FIG. 1.

The shaft furnace shown in the drawing comprises a vertically extending shaft 1 composed of an outer steel shell 1a lined with a refractory 1b and defining a charge-receiving column 1c of generally rectangular cross section (FIG. 3). At the upper end of the furnace 1, there is provided a charging and sealing arrangement 2 described in greater detail in connection with FIG. 5, while, just above the lower end 1d of the column, in a vertical median plane P in the longitudinal direction (see FIGS. 1 and 3), there is provided a gas-distributing device 3 through which the reducing gas is introduced into the furnace. A water-cooled hopper 8 extends from the bottom 1d of the furnace column 1 downwardly to form a mouth 5 provided with a discharge mechanism 4 as will be apparent hereinafter.

The gas-distributing arrangement 3 (see application Ser. No. 568,049 filed July 26, 1966, now U.S. Pat. No. 3,450,396) comprises an upwardly convergent body 6 whose downwardly open trough portion 6a is fed with reducing gas from opposite ends as represented at 7 and permits the gas to flow outwardly through the charge in the furnace (arrows A in FIG. 1). Cooling water can be introduced via a fitting 7a into the interwall compartment 6b of member 6 which spans the full width of the furnace in the direction of the major dimension of this rectangular cross section. The cooling water or steam coolant is removed at 7b. The member 6 is made up of two upwardly convergent flat flanks 6c and 6d which join in a peak 6e lying in the vertical median plane P and extending horizontally.

The discharge arrangement 4 includes a funnel 8 comprising a pair of downwardly and inwardly inclined walls 8a and 8b which run parallel to the gas-distributing member 6, i.e. in the major dimension of the horizontal section of the furnace, while a pair of vertical end walls 9a and 9b are rigid with the walls 8a and 8b. Walls 8a, 8b, 9a and 9b define the outlet 5 of the furnace which has a rectangular cross section corresponding to the vertical projection of the gas-distributing member 6, i.e. the width w of the outlet 5 corresponds to the horizontal width W of the gas-distributing member 6 while the length l of the outlet 5 corresponds to the length L of the gas-distributing member 6. Walls 8a, 8b, 9a and 9b are of double-wall construction and are formed with chambers 8' and 9' which are supplied with a coolant fluid in the usual manner.

The charge in the furnace is supported upon a discharge plate 10 lying in a horizontal plane perpendicular to the vertical median plane P mentioned earlier, just below the outlet 5. Upon this plane, a pushing or pulling arrangement represented at 11' displaces a sweeping bar 11 to discharge the elemental iron (arrow B) alternatively to the right and to the left into a hermetically sealed collector C for the sponge iron. A valve 6' controls the flow of reducing gas to the distributor 6.

In FIGS. 1 and 5 of the drawing, there is shown a sealing and charging apparatus for the shaft furnace 1 which comprises a conveyor-belt arrangement 16 which is reversible as shown by the arrow A and has a discharge-side roll 16a (FIG. 2) shiftable in the direction of arrow B on suitable guides or the like as described in application No. 711,102 so that the conveyor may discharge green pellets of iron oxide or the like into the charging apparatus as represented by arrow C. Since the discharge end of the conveyor moves in the longitudinal direction across the entire mouth of the charging apparatus, the pellets are distributed uniformly in the charging apparatus. An upper gate 12 closes the hopperlike housing 17 which, as can be seen from FIG. 5, has a pair of downwardly and inwardly sloping chutelike walls 17a and 17b reaching to the widest portion 17c of the housing. The horizontal plane H of this portion of the housing intersects a roof-shaped charge distributor 14, the function of which will be described in greater detail hereinafter. Above the plane H, longitudinal walls 17d and 17e converge upwardly and define the mouth 17f of the charging housing 17. Reinforcing webs 17g are provided along the walls 17a, 17b and extend transversely thereto while the housing has end walls 17h and 17i as seen in FIG. 2.

The upper gate 12 comprises a frame 12a overlying the mouth 17f of the housing 17 and having a rectangular configuration with longitudinal walls 12b and transverse walls 12c. The latter are provided with inwardly open guide grooves 12d for the horizontally shiftable closure plate 12e which extends through a slot 22f in one of the walls 12b and is receivable in a closed housing 12g designed to protect the plate against exposure to the elements and contamination. A connecting rod 12h is hinged to the plate 12e at 12i and is articulated at 12j to the piston 25a of a fluid-responsive cylinder 25 connected to the underside of chamber 12g by brackets 25b.

The lower gate or closure arrangement is represented generally at 13 and includes a lower frame 13a made up of walls 13b and 13c, the former having a slot 13f through which the closure plate 13e can be withdrawn into a chamber 13g by a fluid-responsive cylinder 26 mounted by brackets 26b on the housing 13g. The piston 26a is articulated at 13j to the connecting rod 13h which extends through the housing 13g and is pivotally connected at 13i to the plate 13e. Guide channels 13d, confronting one another in the walls 13c of the frame, slidably receive the plate 13e. In each frame the free end of the plate 12e, 13e is receivable in a further groove 12k, 13k to ensure total sealing of the apparatus.

As noted earlier, below the center of the mouth 4f, there is provided a roof or copinglike charge-distributing element 14 in the form of a hood which lies in the vertical median plane P of the apparatus and extends the full length thereof horizontally between the end walls 17h and 17i to which this hood 14 is secured. The hood comprises a pair of downwardly diverging flanks and united in a peak and including with one another an acute angle of about 70° as represented at α. The flanks are plates which curve inwardly into aprons and closely flank a pair of tubular shafts 18 journaled in bearing assemblies 30 in the end walls 17h and 17i through which these shafts extend, the bearing assemblies having seals held in place by packing nuts to prevent leakage of gas from the housing 17. The distributor 14 has the function of uniformly distributing the charge within the housing 17 onto a pair of wings or flaps 15 extending radially from the shafts 18, and reinforced by ribs 15 of triangular configuration. The distributor serves to reduce the free-fall height of the charge and allows the charge to tumble along the outer surfaces of the flanks in a sliding and rolling action which has been found to be less detrimental to green pellets, in spite of the low compressive strength and wear-resistance thereof. The bottom edges of the aprons sealingly abut the flaps 15 when the latter are in their upper, outwardly swung positions represented in solid lines in FIG. 5. The aprons protect the shafts 18 which they flank, from contact with the charge. The shafts 18 define pivotal axes for the flaps 15 which lie in a horizontal plane H' and enable the flaps to be swung in opposite senses about these axes. To this end, externally of the housing 17, the shafts are provided with intermeshing gears 18a, best seen in FIG. 5. In their upper positions, the flaps 15 abut, at their free ends, stops 23, formed in the walls 17a and 17b of the housing, while in their lower or "open" position, the flaps abut one another in the plane P as represented in broken lines in FIGS. 1 and 5. To actuate the flaps 15, there is provided a fluid-responsive cylinder arrangement 15b, the piston 15a of which is vertically shiftable (arrow K) and is articulated to a lever arm 15c affixed to a shaft 18.

When the flaps 11 and 12 are swung inwardly into abutment at 24, they define with the walls 17a and 17b respective chutes through which the charge flows in the direction of arrows L and M in two streams to ensure a thorough mixing and further prevent separation of the charge. When the gate 13 is opened, the charge cascades downwardly through the widow in the direction of arrow Q into shaft furnace 1. In this system, the flaps 15 need not be hermetically sealing to accomplish the objects of the invention. The cylinder 15b and the cylinders 25, 26 are connected to a programmer 30 which is provided with an interlock between the lower gate 13 and the flaps 15 as that the latter cannot be swung inwardly as long as the gate 13 is open.

The sequence of operations, as determined by the programmer 30, initially opens the upper gate 12 while maintaining the lower gate 13 closed and the flaps 15 in the spread positions show in solid lines in FIG. 1. Only when the gate 12 has been fully withdrawn, does the programmer operate the conveyor 16 to deposit the charge uniformly in the housing 17.

Thereafter, the supply of the charge through the mouth 17f of the housing 17 is terminated and the gate 12 fully closed and the gate 13 fully opened before the programmer 30 swings the flaps 15 inwardly to empty the charge into the furnace. Since high-velocity gases do not flow past the sealing edges of the gates 12 and 13 at any time during this operational sequence and never are forced through narrow gaps between sealing members in the housing, deterioration of these members is reduced. Funnellike aprons 29 and 40 above the gates 12 and 13 are provided inwardly of the frame members to prevent movement of the charge in the register of the sealing edges. As the charge is formed in the furnace, it constitutes a cushion bed for subsequent layers and thereby reduces the free-fall height.

The width w of the gas distributor 6, according to the present invention ranges between one-fifth and one-third of the width D of the furnace opening at its base and preferably for one-fourth of this width. The flanks 6c and 6d include an angle β at the peak 6e ranging between 40° and 60°. The bed of the charge within the furnace which sinks gradually pass the gas distributor 6 and is separated thereby into two streams which unite in the funnel 8 beneath the gas distributor, the walls of which include an angle γ with one another of about 60°. The gas distributor 6 serves to dispense the reducing gas uniformly over the entire furnace cross section and this member also serves to increase the friction resisting downward movement of the charge as it passes into the hopper. In general, the walls 8a and 8b include angles of γ/2 between 20° and 40° with the vertical plane P and so chosen that the width w of the outlet 5 is equal to the width W of the gas distributor 6 in projection. The outlet opening 5 can, however, remain somewhat smaller than this width W. When the width of the outlet exceeds that of the gas distributor 6, it is found that a nonuniform reaction time for the charge in the furnace is obtained. It is essential for the purposes of the present invention that walls 9a and 9b be vertical.

The discharge member 11 is coupled via its drive 11' with the programmer 30 as is the valve V so that the gas flow is related to the rate at which the charge is effected from the furnace and the rate at which additional charge is supplied, the conveyor 16 being similarly connected to the programmer 30. The bar 11 has the configuration of an isosceles trapezoid whose broad base faces downwardly while its narrow base faces upwardly. The pressure of the charge on the inclined flanks of this trapezoidal member facilitates shifting thereof to the left and to the right by virtue of the force component of the weight in these directions. With each stroke, the shiftable bar 11, in accordance with its stroke length, dispenses constant quantity of the reduced metal laterally into the collector C. The horizontal width of the bar 11 should extend between 20 and 80 percent of the width w of the outlet 5, preferably 30 to 50 percent whereby the weight of the charge is carried in part by the plate 10. At the ends of the furnace, the bar 11 need not be confined as shown at 11a and may merely extend beyond the walls 9a and 9b so that it is of a slightly greater length than the length l shown in FIG. 2. The charge in this region serves to prevent escape of gas downwardly. Of course, instead of a single bar 11, a plurality of adjacent bars may be used, especially where the shaft furnace has an exceptionally large width. Moreover, as described in application Ser. No. 711,102 two charging housings may be provided whereupon the conveyor 6 may be reversible to alternately deposit its charge in these housings.

The improvement described and illustrated is believed to admit of many modifications within the ability of persons skilled in the art, all such modifications being considered within the spirit and scope of the invention except as limited by the appended claims.

We claim:
1. In a shaft-furnace installation, in combination:
a vertically extending shaft furnace of generally rectangular cross section;
charging means including
a housing surmounting said shaft furnace and provided with upper and lower closure members and
charge-catching means intermediate said closure members for receiving an increment of charge upon opening of the upper closure member and emptying said increment of charge into said furnace upon opening of the lower closure members, said housing being formed with upper and lower horizontal frames, said closure members being formed as respective horizontally shiftable plates slidable in said frames, said charge-catching means including an upwardly converging horizontal charge-distributing member lying in a vertical median plane through said furnace, and a pair of outwardly and inwardly swingable flaps having horizontal pivotal axes within the outline of said charge-distributing member and disposed therebelow for temporarily retaining increments of charge in said housing, said flaps and said charge-distributing member having a plan outline in the outwardly swung positions of said flaps corresponding to the cross section of the upper end of said furnace;

means for introducing a reducing gas into the bottom of said furnace and including a gas-distributing member mounted in said furnace at the bottom thereof extending longitudinally of the rectangular cross section of said furnace and substantially in said vertical median plane parallel to said charge-distributing member, and duct means for introducing said gas into said gas-distributing member at least at one end thereof; and discharge means at the bottom of said furnace including a downwardly converging hopper having a pair of downwardly converging longitudinal walls and a pair of vertical walls together defining a discharge opening of a maximum cross-sectional area corresponding to the vertical projection of said gas-distributing member member, a horizontal support plate disposed below said discharge opening and spaced therefrom, and at least one horizontally shiftable discharge bar slidable along said support plate for laterally dispensing reduced charge from said furnace.

2. In a shaft-furnace installation, in combination:

a vertically extending shaft furnace of generally rectangular cross section;

charging means including a housing surmounting said shaft furnace and provided with upper and lower closure members, and charge-catching means intermediate said closure members for receiving an increment of charge upon opening of the upper closure member and emptying said increment of charge into said furnace upon opening of the lower closure member;

means for introducing a reducing gas into the bottom of said furnace and including a gas-distributing member mounted in said furnace at the bottom thereof extending longitudinally of the rectangular cross section of said furnace and substantially in a vertical median plane therethrough, and duct means for introducing said gas into said gas-distributing member at least at one end thereof; and discharge means at the bottom of said furnace including a downwardly converging hopper having a pair of downwardly converging longitudinal walls and a pair of vertical walls together defining a discharge opening of a maximum cross-sectional area corresponding to the vertical projection of said gas-distributing member, a horizontal support plate disposed below said discharge opening and spaced therefrom, and at least one horizontally shiftable discharge bar slidable along said support plate for laterally dispensing reduced charge from said furnace, said gas-distributing member being formed as downwardly open through having upwardly converging frustoconical flanks defining a peak extending in the longitudinal dimension of the rectangular cross section of said furnace, said bar having a width ranging between 20 and 80 percent of the width of said discharge opening, said discharge opening having a cross secton substantially equal to the horizontal plan projection of said gas-distributing member and said bar having a transverse stroke of 30 to 50 percent of said width of said discharge opening, said housing being formed with upper and lower horizontal frames, said closure members being formed as respective horizontally shiftable plates slidable in said frames, said charge-catching means including an upwardly converging horizontal charge-distributing member extending parallel to said gas-distributing member in said vertical median plane, and a pair of outwardly and inwardly swingable flaps having horizontal pivotal axes within the outline of said charge-distributing member and disposed therebelow for temporarily retaining increments of charge in said housing, each of said flaps being formed with a shaft extending along the respective axis and shielded by said charge-distributing member, means coupling said shaft for joint rotation, and actuating means for angularly displacing at least one of said shafts.

3. The installation defined in claim 2 wherein said flanks include an angle of substantially 40° to 50° with one another.

4. The installation defined in claim 2 wherein the width of said gas-distributing element in horizontal plan is about one-fifth to one-third of the width of said furnace at the bottom thereof.

5. The installation defined in claim 2 wherein said furnace widens progressively from its top to its bottom.

6. The installation defined in claim 2 wherein said housing has a pair of longitudinal downwardly converging walls and a pair of vertical end walls defining a discharge opening registering with the top of said furnace.

7. The installation defined in claim 6, further comprising conveyor means above said upper closure member and shiftable in the longitudinal dimension of the furnace cross section for introducing the charge increments into said housing.